J. I. HOKE.
POLE OR TONGUE CONSTRUCTION.
APPLICATION FILED DEC. 27, 1913.
1,094,330.
Patented Apr. 21, 1914.
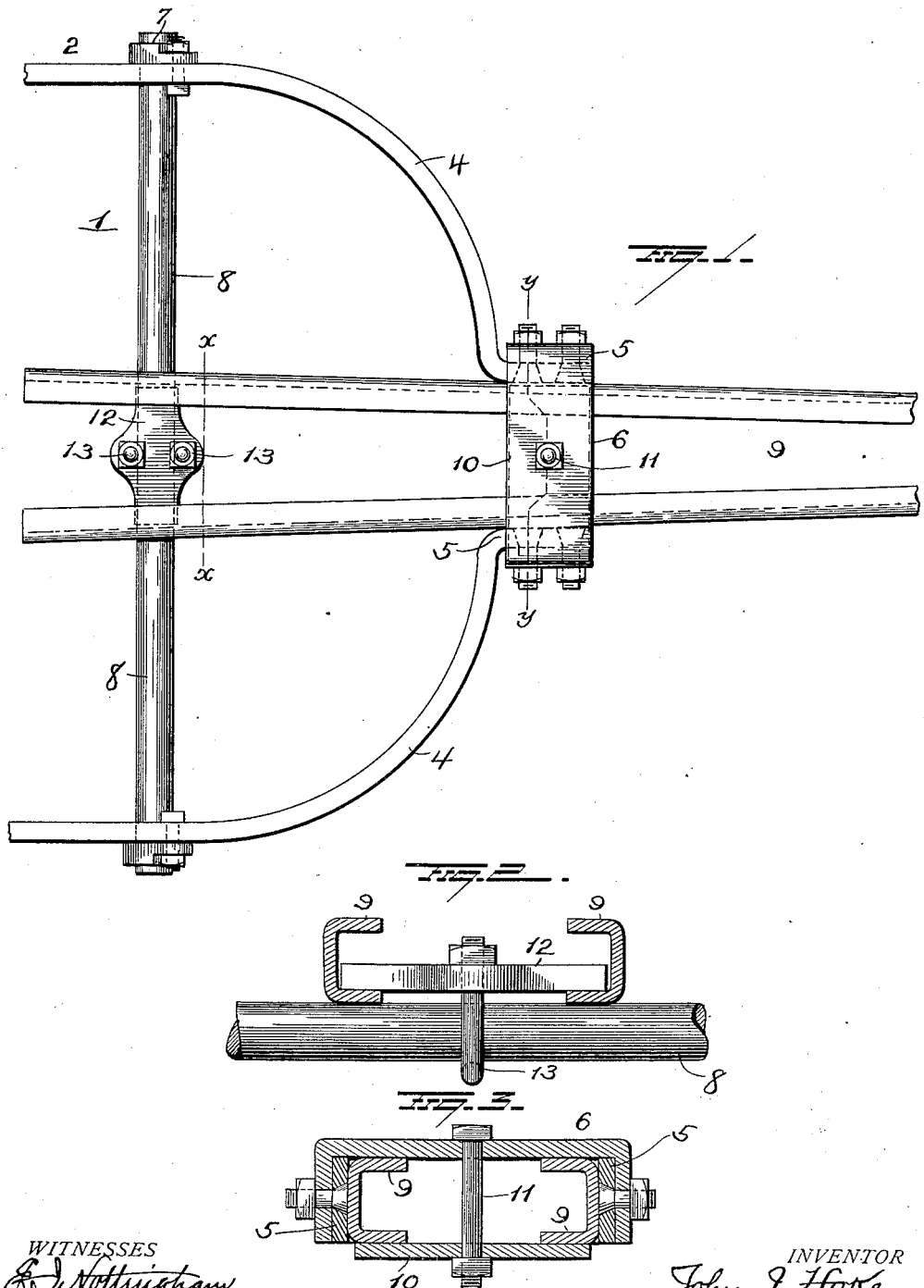
WITNESSES
INVENTOR
John I. Hoke
By F. A. Seymour
Attorney

UNITED STATES PATENT OFFICE.

JOHN I. HOKE, OF SOUTH BEND, INDIANA, ASSIGNOR TO OLIVER CHILLED PLOW WORKS, OF SOUTH BEND, INDIANA.

POLE OR TONGUE CONSTRUCTION.

1,094,330.

Specification of Letters Patent.

Patented Apr. 21, 1914.

Original application filed September 26, 1913, Serial No. 791,977. Divided and this application filed December 27, 1913. Serial No. 808,995.

*To all whom it may concern:*

Be it known that I, JOHN I. HOKE, of South Bend, in the county of St. Joseph and State of Indiana, have invented certain new and useful Improvements in Pole or Tongue Constructions, and do hereby declare the following to be a full, clear, and exact description of the invention, such as will enable others skilled in the art to which it appertains to make and use the same.

This invention relates to improvements in pole or tongue constructions and more particularly to such as are adaptable for use with wheeled cultivators,—this application being a division of my application filed Sept. 26th, 1913, and designated by Serial No. 791,977.

The object of my present invention is to provide simple and efficient means for so connecting the pole or tongue of a riding cultivator to the frame thereof, that said tongue or pole may be adjusted lengthwise, without the use of bolts passing through the pole members, to accommodate the sizes of the draft animals, and thus avoid connecting the harness of the draft animals with the pole or tongue rearwardly of the forward end of the latter.

With this and other objects in view, the invention consists in certain novel features of construction as hereinafter set forth and pointed out in the claims.

In the accompanying drawings; Figure 1 is a plan view showing a portion of a cultivator frame with my improvements applied thereto; Fig. 2 is an enlarged sectional view on the line $x$—$x$ of Fig. 1, and Fig. 3 is an enlarged sectional view on the line $y$—$y$ of Fig. 1.

1 represents a portion of the frame of a riding cultivator. This frame comprises two members 2, 3, which are bent toward each other at their forward ends, as at 4, and terminate in short forwardly projecting arms 5 disposed parallel with each other and spaced apart, said arms being connected by a flanged plate 6 bolted thereto. Somewhat in rear of the inwardly bent forward ends of the frame members, bearings 7 are secured to the latter for the reception of a cross bar 8 which extends across the forward portion of the frame. A tongue or pole 9 which, in the present instance, passes between the arms 5 of the frame members and under the plate 6 and the rear portion of said tongue or pole extends over the cross bar 8.

The tongue or pole members may be made of metal and are secured to the forward end of the frame by means of a clamp plate 10 which engages the under sides of the pole members and is tightened by a bolt 11 passing through the plate 6. The clamping means for the pole to the forward end of the frame thus comprises the plate 6, clamp plate 10 and bolt 11. A clamp 12 is also provided for securing the pole members to the cross bar 8 and engages the lower flanges of the respective pole members, said clamp being secured to the cross bar by means of a U-bolt 13. By loosening the clamp 12 and also the clamping plate 10 at the forward end of the frame, the pole may be accurately adjusted lengthwise to accommodate it to the size of the draft animals employed, and thus the inconvenience incident to connecting the harness to the pole rearwardly of its forward end, will be obviated by the lengthwise adjustment of the pole relatively to the cultivator frame.

Having fully described my invention what I claim as new and desire to secure by Letters-Patent, is:—

1. The combination with a frame, a cross bar thereon, and a pole, of clamping means adjustably securing the pole to the frame, and clamping means adjustably securing the rear portion of the pole to the cross bar.

2. The combination with a frame, a cross bar in rear of the forward end of said frame, and a pole comprising two members, of clamping devices securing the pole members to the forward end of the frame, and clamping devices securing said pole members to the cross bar.

3. The combination with a frame having parallel arms at its forward end, a plate connecting said arms, and a cross bar in rear of the forward end of the frame, of a pole comprising two channel members passing between said arms and over the cross bar, a clamping plate engaging the bottom faces of channel pole members, a bolt connecting said clamping plate with the connecting plate at the forward end of the frame, a clamping plate engaging the lower flanges of the channel pole members, and a bolt connecting said last mentioned clamping plate with the cross bar.

In testimony whereof, I have signed this specification in the presence of two subscribing witnesses.

JOHN I. HOKE.

Witnesses:
 EDWIN NICAR,
 KATE E. BUCKLEY.

Copies of this patent may be obtained for five cents each, by addressing the " Commissioner of Patents, Washington, D. C."